(12) United States Patent
Tsukahara et al.

(10) Patent No.: US 11,084,939 B2
(45) Date of Patent: Aug. 10, 2021

(54) ANTI-FOGGING COATING COMPOSITION AND ARTICLE

(71) Applicant: ADEKA CORPORATION, Tokyo (JP)

(72) Inventors: Naoki Tsukahara, Tokyo (JP); Youichi Aya, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 104 days.

(21) Appl. No.: 16/340,588

(22) PCT Filed: Sep. 25, 2017

(86) PCT No.: PCT/JP2017/034489
§ 371 (c)(1),
(2) Date: Apr. 9, 2019

(87) PCT Pub. No.: WO2018/070227
PCT Pub. Date: Apr. 19, 2018

(65) Prior Publication Data
US 2019/0292376 A1 Sep. 26, 2019

(30) Foreign Application Priority Data

Oct. 14, 2016 (JP) .............................. JP2016-202406

(51) Int. Cl.
| | |
|---|---|
| *C09D 4/00* | (2006.01) |
| *C09D 7/63* | (2018.01) |
| *B05D 5/00* | (2006.01) |
| *B05D 7/24* | (2006.01) |
| *C09D 7/40* | (2018.01) |
| *C08F 236/22* | (2006.01) |
| *C09K 3/18* | (2006.01) |

(52) U.S. Cl.
CPC ................ *C09D 4/00* (2013.01); *B05D 5/00* (2013.01); *B05D 7/24* (2013.01); *C09D 7/40* (2018.01); *C09D 7/63* (2018.01); *C08F 236/22* (2013.01); *C09K 3/18* (2013.01)

(58) Field of Classification Search
CPC ... C09D 4/00; C09D 7/40; C09D 7/63; C09K 3/18; C08F 236/22; B05D 5/00; B05D 7/24
See application file for complete search history.

(56) References Cited

U.S. PATENT DOCUMENTS 10,221,331 B2 * 3/2019 Deshpande .......... C09D 133/06
2017/0226371 A1   8/2017 Deshpande et al.

FOREIGN PATENT DOCUMENTS

| | | |
|---|---|---|
| JP | 61-76563 | 4/1986 |
| JP | 1-249818 | 10/1989 |
| JP | 6-9737 | 1/1994 |
| JP | 7-330845 | 12/1995 |
| JP | 8-231887 | 9/1996 |
| JP | 10-183015 | 7/1998 |
| JP | 11-116892 | 4/1999 |
| JP | 11-181039 | 7/1999 |
| JP | 2003-82272 | 3/2003 |
| JP | 2005-146227 | 6/2005 |
| JP | 2005-187576 | 7/2005 |
| JP | 2007-277537 | 10/2007 |
| TW | I702282 | 8/2020 |
| WO | 2017/136658 | 8/2017 |

OTHER PUBLICATIONS

Extended European Search Report dated Mar. 10, 2020 in corresponding European Patent Application No. 17859478.4.
International Search Report dated Jan. 9, 2018 in corresponding Application No. PCT/JP2017/034489.
Office Action dated Jun. 1, 2021 in European Patent Application No. 17 859 478.4.

* cited by examiner

*Primary Examiner* — Sanza L. McClendon
(74) *Attorney, Agent, or Firm* — Wenderoth, Lind & Ponack, L.L.P.

(57) ABSTRACT

An anti-fogging coating composition comprising (A) a radical-polymerizable monomer having at least three radical-polymerizable carbon-carbon double bonds, (B) a surfactant represented by general formula (1) below and (C) a photopolymerization initiator.

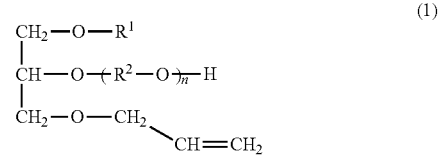

(1)

In general formula (1) above, $R^1$ represents an unsubstituted alkyl group having 8 to 30 carbon atoms, a fluorine atom-containing alkyl group having 8 to 30 carbon atoms, or an aryl group having at least one unsubstituted alkyl group having 8 to 30 carbon atoms, $R^2$ represents a divalent hydrocarbon group having 2 to 4 carbon atoms, and n represents an integer of 1 to 1000.

10 Claims, No Drawings

ANTI-FOGGING COATING COMPOSITION AND ARTICLE

TECHNICAL FIELD

This invention relates to an anti-fogging coating composition and an article, and more specifically relates to an anti-fogging coating composition capable of forming a coating film having excellent coating film properties, such as hardness and transparency, and an article having said coating film.

BACKGROUND ART

In cases where a surface of an object is at a temperature that is not higher than the dew point of the surrounding atmosphere, fogging occurs as a result of water vapor condensing in the form of water droplets on the surface. Such fogging is a particular problem in applications requiring visibility, such as goggles and sunglasses. In addition, in applications such as motor vehicle headlamps, where appearance is important, fogging also occurs on inner surfaces that are difficult to wipe. Furthermore, in covering materials such as vinyl sheets used in agricultural houses, because fogging occurs as a result of moist air filling the inside, the fogging obstructs transmission of sunlight, and larger water droplets formed by growth of ultrafine liquid droplets drip down onto crops, which can inhibit growth of the crops and cause discoloration or putrefaction of the crops.

Members in applications such as those mentioned above are made from a variety of materials, such as metals, glasses and plastics, but performance required of these coating agents includes anti-fogging properties as well as protection from external environments (anti-fouling properties, water resistance, chemical resistance, and the like), and extensive development of anti-fogging coating products has occurred in recent years.

Patent Documents 1 and 2 provide coating compositions obtained using a variety of acrylic monomers, ethylene oxide addition type acrylate compounds and polymerization initiators, and these coating compositions can form coating films having a certain degree of performance, but do not exhibit anti-fogging properties at levels that fulfill the needs of the market.

Patent Document 3 provides an anti-fogging coating material obtained using a polymerizable monomer that is a metal salt of a sulfonic acid having a long chain alkyl group. This anti-fogging coating material is understood to be able to form a coating film having a certain degree of anti-fogging properties, but was not evaluated as being satisfactory in terms of contact angle with water of a coating film, which is an indicator of high anti-fogging properties.

CITATION LIST

Patent Document

Patent Document 1: Japanese Patent Application Laid-open No. 2007-277537
Patent Document 2: Japanese Patent Application Laid-open No. 2003-082272
Patent Document 3: Japanese Patent Application Laid-open No. 2005-146227

SUMMARY OF INVENTION

Technical Problem

Therefore, the problem to be solved by this invention is to provide an anti-fogging coating composition capable of forming a coating film having high hardness and transparency and particularly excellent anti-fogging properties.

Solution to Problem

As a result of diligent research in order to solve the problem mentioned above, the inventors of this invention found that a composition comprising a specific radical-polymerizable monomer, a specific non-ionic reactive surfactant and a photopolymerization initiator could form a coating film having high hardness and transparency and particularly excellent anti-fogging properties, and thereby completed this invention.

That is, this invention is an anti-fogging coating composition comprising (A) a radical-polymerizable monomer having at least three radical-polymerizable carbon-carbon double bonds, (B) a surfactant represented by general formula (1) below and (C) a photopolymerization initiator.

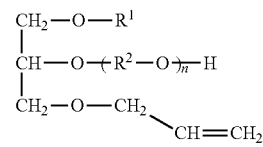

(1)

In general formula (1) above, $R^1$ represents an unsubstituted alkyl group having 8 to 30 carbon atoms, a fluorine atom-containing alkyl group having 8 to 30 carbon atoms, or an aryl group having at least one unsubstituted alkyl group having 8 to 30 carbon atoms, $R^2$ represents a divalent hydrocarbon group having 2 to 4 carbon atoms, and n represents an integer of 1 to 1000.

Advantageous Effects of Invention

The anti-fogging coating composition of this invention can form a coating film having high hardness and transparency and particularly excellent anti-fogging properties. Therefore, the anti-fogging coating composition of this invention can be advantageously used to impart anti-fogging properties to motor vehicle headlamps, mirrors and types of glasses such as goggles and sunglasses.

DESCRIPTION OF EMBODIMENTS

The anti-fogging coating composition of this invention will now be explained in detail.

The anti-fogging coating composition of this invention is an anti-fogging coating composition comprising (A) a radical-polymerizable monomer having at least three radical-polymerizable carbon-carbon double bonds, (B) a surfactant represented by general formula (1) below and (C) a photopolymerization initiator.

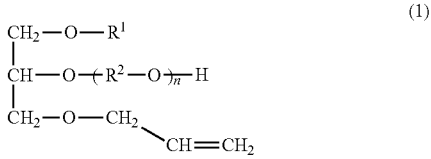

In general formula (1) above, $R^1$ represents an unsubstituted alkyl group having 8 to 30 carbon atoms, a fluorine atom-containing alkyl group having 8 to 30 carbon atoms, or an aryl group having at least one unsubstituted alkyl group having 8 to 30 carbon atoms, $R^2$ represents a divalent hydrocarbon group having 2 to 4 carbon atoms, and n represents an integer of 1 to 1000.

[(A) Radical-Polymerizable Monomer Having at Least Three Radical-Polymerizable Carbon-Carbon Double Bonds]

In this invention, the radical-polymerizable monomer of component (A) is a compound having at least three radical-polymerizable carbon-carbon double bonds. Examples of radical-polymerizable carbon-carbon double bonds include vinyl groups, allyl groups, acrylic groups and methacrylic groups.

In this invention, a monomer having a number average molecular weight of 2000 or less is preferred as the radical-polymerizable monomer of component (A), and specific examples thereof include trimethylolpropane triacrylate, ethoxylated trimethylolpropane triacrylate, propoxylated trimethylolpropane triacrylate, pentaerythritol triacrylate, ethoxylated glycerin triacrylate, tetramethylolmethane triacrylate, pentaerythritol tetraacrylate, ethoxylated pentaerythritol tetraacrylate, EO-modified diglycerol tetraacrylate, ditrimethylolpropane tetraacrylate and dipentaerythritol hexaacrylate. It is possible to use one of these radical-polymerizable monomers in isolation, or a combination of two or more types thereof.

Among these radical-polymerizable monomers, a compound having at least 4 radical-polymerizable carbon-carbon double bonds is preferred from the perspective of being able to further improve the hardness of a coating film, and dipentaerythritol hexaacrylate is more preferred from the perspective of ease of procurement.

In this invention, it is possible to use a combination of a radical-polymerizable monomer having one radical-polymerizable carbon-carbon double bond (a monofunctional radical-polymerizable monomer) and a radical-polymerizable monomer having two radical-polymerizable carbon-carbon double bonds (a difunctional radical-polymerizable monomer) as a radical-polymerizable monomer other than component (A). It is possible to use one of these radical-polymerizable monomers in isolation, or a combination of two or more types thereof.

A monomer having a number average molecular weight of 1000 or less is preferred as the monofunctional radical-polymerizable monomer, and specific examples thereof include (meth)acrylic acid esters such as methyl (meth)acrylate, ethyl (meth)acrylate, butyl (meth)acrylate, 2-ethylhexyl (meth)acrylate, lauryl (meth)acrylate, tridecyl (meth)acrylate, stearyl (meth)acrylate, cyclohexyl (meth)acrylate, benzyl (meth)acrylate, isobornyl (meth)acrylate, glycidyl (meth)acrylate, tetrahydrofurfuryl (meth)acrylate, hydroxyethyl (meth)acrylate, hydroxypropyl (meth)acrylate and hydroxybutyl (meth)acrylate; monocarboxylic acids such as (meth)acrylic acid; dicarboxylic acids, such as itaconic acid, maleic acid and succinic acid, and half esters (monoesters) and diesters thereof; vinyl esters such as vinyl acetate and vinyl propionate; and styrene compounds such as styrene and α-methylstyrene. It is possible to use one of these monofunctional radical-polymerizable monomers in isolation, or a combination of two or more types thereof. Moreover, in this specification, (meth)acrylic acid means acrylic acid or methacrylic acid. Methyl (meth)acrylate means methyl acrylate or methyl methacrylate.

A monomer having a number average molecular weight of 1000 or less is preferred as the difunctional radical-polymerizable monomer, and specific examples thereof include 1,10-decane diol diacrylate, 2-methyl-1,8-octane diol diacrylate, 2-butyl-2-ethyl-1,3-propane diol diacrylate, 1,9-nonane diol diacrylate, 1,8-octane diol diacrylate, 1,7-heptane diol diacrylate, polytetramethylene glycol diacrylate, 3-methyl-1,5-pentane diol diacrylate, 1,6-hexane diol diacrylate, neopentyl glycol diacrylate, hydroxypivalic acid neopentyl glycol diacrylate, tripropylene glycol diacrylate, 1,4-butane diol diacrylate, dipropylene glycol diacrylate, divinylbenzene and diallylbenzene. It is possible to use one of these difunctional radical-polymerizable monomers in isolation, or a combination of two or more types thereof.

In this invention, in cases where a radical-polymerizable monomer other than component (A) mentioned above is used, the usage quantity thereof is preferably greater than 0 mass % to 50 mass %, and more preferably greater than 0 mass % to 25 mass %, relative to the overall mass of radical-polymerizable monomers (the overall mass of the radical-polymerizable monomer of component (A) and the radical-polymerizable monomer other than component (A)). In cases where the amount of the radical-polymerizable monomer other than component (A) exceeds 50 mass %, the performance (hardness, water resistance, and the like) of a formed coating film tends to decrease.

[(B) Surfactant]

In this invention, the surfactant of component (B) is a compound represented by general formula (1) below.

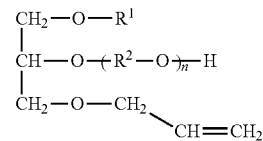

In general formula (1) above, $R^1$ represents an unsubstituted alkyl group having 8 to 30 carbon atoms, a fluorine atom-containing alkyl group having 8 to 30 carbon atoms, or an aryl group having at least one unsubstituted alkyl group having 8 to 30 carbon atoms, $R^2$ represents a divalent hydrocarbon group having 2 to 4 carbon atoms, and n represents an integer of 1 to 1000.

In general formula (1) above, $R^1$ represents an unsubstituted alkyl group having 8 to 30 carbon atoms, a fluorine atom-containing alkyl group having 8 to 30 carbon atoms, or an aryl group having at least one unsubstituted alkyl group having 8 to 30 carbon atoms. Specific examples of unsubstituted alkyl groups having 8 to 30 carbon atoms include octyl groups, 2-ethylhexyl groups, secondary octyl groups, nonyl groups, secondary nonyl groups, decyl groups, secondary decyl groups, undecyl groups, secondary undecyl groups, dodecyl groups, secondary dodecyl groups, tridecyl groups, isotridecyl groups, secondary tridecyl groups, tetradecyl groups, secondary tetradecyl groups, hexadecyl groups, secondary hexadecyl groups, stearyl groups, icosyl groups, docosyl groups, tetracosyl groups, triacontyl groups, 2-butyloctyl groups, 2-butyldecyl groups, 2-hexyloctyl groups, 2-hexyldecyl groups, 2-octyldecyl groups, 2-hexyldodecyl groups, 2-octyldodecyl groups, 2-decyltetradecyl groups and 2-dodecylhexadecyl groups.

Specific examples of fluorine atom-containing alkyl groups having 8 to 30 carbon atoms include perfluoroalkyl groups represented by the formula $C_nF_{2n+1}$, such as perfluorooctyl groups, perfluoro-2-ethylhexyl groups, perfluorononyl groups, perfluorodecyl groups, perfluoroundecyl groups, perfluorododecyl groups, perfluorotridecyl groups, perfluoroisotridecyl groups, perfluorotetradecyl groups, perfluorohexadecyl groups, perfluorooctadecyl groups, perfluoroicosyl groups, perfluorodocosyl groups, perfluorotetracosyl groups, perfluorotriacontyl groups, perfluoro-2-octyldodecyl groups, perfluoro-2-dodecylhexadecyl groups and perfluoro-2-tetradecyloctadecyl groups; fluoroalkyl groups represented by the formula $C_nF_{2n-1}H_2$ or $F(CF_2)_{n-1}CH_2-$, such as pentadecafluorooctyl groups, heptadecafluorononyl groups, nonadecafluorodecyl groups, heneicosafluoroundecyl groups, tricosafluorododecyl groups, pentacosafluorotridecyl groups, heptacosafluorotetradecyl groups and nonacosafluoropentadecyl groups; fluoroalkyl groups represented by the formula $C_nF_{2n-2}H_3$ or $H(CF_2)_{n-1}CH_2-$, such as tetradecafluorooctyl groups, hexadecafluorononyl groups, octadecafluorodecyl groups, eicosafluoroundecyl groups, docosafluorododecyl groups, tetracosafluorotridecyl groups, hexacosafluorotetradecyl groups, octacosafluoropentadecyl groups and triacontafluorohexadecyl groups; fluoroalkyl groups represented by the formula $C_nF_{2n-3}H_4$ or $F(CF_2)_{n-2}CH_2CH_2-$, such as tridecafluorooctyl groups, pentadecafluorononyl groups, heptadecafluorodecyl groups, nonadecafluoroundecyl groups, heneicosafluorododecyl groups, tricosafluorotridecyl groups, pentacosafluorotetradecyl groups, heptacosafluoropentadecyl groups and nonacosafluorohexadecyl groups; fluoroalkyl groups represented by the formula $C_nF_{2n-5}H_6$ or $F(CF_2)_{n-3}CH_2CH_2CH_2-$, such as undecafluorooctyl groups, tridecafluorononyl groups, pentadecafluorodecyl groups, heptadecafluoroundecyl groups, nonadecafluorododecyl groups, heneicosafluorotridecyl groups, tricosafluorotetradecyl groups, pentacosafluoropentadecyl groups and heptacosafluorohexadecyl groups; and fluoroalkyl groups represented by the formula $C_nF_{2n-11}H_{12}$ or $F(CF_2)_{n-6}(CH_2)_6-$, such as pentafluorooctyl groups, heptafluorononyl groups, nonafluorodecyl groups, undecafluoroundecyl groups, tridecafluorododecyl groups, pentadecafluorotridecyl groups, heptadecafluorotetradecyl groups, nonadecafluoropentadecyl groups and heneicosafluorohexadecyl groups.

Examples of aryl groups in the aryl group having at least one unsubstituted alkyl group having 8 to 30 carbon atoms include phenyl groups and naphthyl groups.

Examples of alkyl groups in the aryl group having at least one unsubstituted alkyl group having 8 to 30 carbon atoms include octyl groups, 2-ethylhexyl groups, secondary octyl groups, nonyl groups, secondary nonyl groups, decyl groups, secondary decyl groups, undecyl groups, secondary undecyl groups, dodecyl groups, secondary dodecyl groups, tridecyl groups, isotridecyl groups, secondary tridecyl groups, tetradecyl groups, secondary tetradecyl groups, hexadecyl groups, secondary hexadecyl groups, stearyl groups, icosyl groups, docosyl groups, tetracosyl groups, triacontyl groups, 2-butyloctyl groups, 2-butyldecyl groups, 2-hexyloctyl groups, 2-hexyldecyl groups, 2-octyldecyl groups, 2-hexyldodecyl groups, 2-octyldodecyl groups, 2-decyltetradecyl groups and 2-dodecylhexadecyl groups.

The number of alkyl group substituents in the aryl group is 1 to 5, but one substituent group is preferred from the perspective of production applicability.

$R^1$ in general formula (1) above is preferably an unsubstituted alkyl group having 8 to 30 carbon atoms or a phenyl group having at least one unsubstituted alkyl group having 8 to 30 carbon atoms from the perspective of being able to be procured inexpensively, and is more preferably an unsubstituted alkyl group having 8 to 22 carbon atoms or a phenyl group having at least one unsubstituted alkyl group having 8 to 14 carbon atoms, and further preferably an unsubstituted alkyl group having 10 to 14 carbon atoms, from the perspective of emulsifiability of the radical-polymerizable monomer.

$R^2$ in general formula (1) above is a divalent hydrocarbon group having 2 to 4 carbon atoms, and is preferably a methylene group or propylene group, and more preferably a methylene group, from the perspective of emulsifiability of the radical-polymerizable monomer.

n in general formula (1) above is an integer of 1 to 1000, and is preferably an integer of 1 to 100, and more preferably an integer of 1 to 50, from the perspectives of ease of production and emulsifiability of the radical-polymerizable monomer.

The method for producing the surfactant of component (B) in this invention is not particularly limited, and it is possible to use a publicly known production method such as those disclosed in, for example, Japanese Examined Patent Publication No. H05-75001 and Japanese Patent No. 4564809. That is, this surfactant can be produced by reacting a hydroxy compound with allyl glycidyl ether for a period of 3 to 20 hours at a temperature of 50° C. to 160° C. using a catalyst such as a boron trifluoride ether salt or sodium hydroxide if necessary, and then reacting with an alkylene oxide such as ethylene oxide for a period of 1 to 30 hours at a temperature of 80° C. to 160° C. using a catalyst such as sodium hydroxide or potassium hydroxide. The hydroxy compound mentioned above is a compound having one hydroxyl group for the introduction of $R^1$, and is an alcohol having $R^1$ exemplified above as a residue. For example, in cases where an undecyl group is to be introduced, it is possible to introduce an undecyl group as $R^1$ using undecyl alcohol as the hydroxy compound.

The usage quantity of the surfactant of component (B) in this invention is preferably 1 to 50 mass % relative to the total mass of the radical-polymerizable monomers of component (A) (in cases where a radical-polymerizable monomer other than component (A) is used, the total mass of the radical-polymerizable monomer of component (A) and the radical-polymerizable monomer other than component (A)) and the surfactant of component (B), and is more preferably 5 to 30 mass %, further preferably 8 to 25 mass %, and most preferably 10 to 20 mass %, from the perspective of achieving a balance between anti-fogging properties and water resistance of a coating film.

[(C) Photopolymerization Initiator]

In this invention, the photopolymerization initiator of component (C) is a compound that enables radical polymerization to be initiated through light irradiation, and preferred examples thereof include acetophenone-based compounds, benzyl-based compounds, ketone-based compounds such as benzophenone-based compounds and thioxanthone-based compounds, and oxime-based compounds.

Examples of the acetophenone-based compounds mentioned above include diethoxyacetophenone, 2-hydroxy-2-methyl-1-phenylpropan-1-one, 4'-isopropyl-2-hydroxy-2-methylpropiophenone, 2-hydroxymethyl-2- methylpropiophenone, 2,2-dimethoxy-1,2-diphenylethan-1-one, p-dimethylaminoacetophenone, p-tert-butyldichloroacetophenone, p-tert-butyltrichloroacetophenone, p-azidobenzalacetophenone, 1-hydroxycyclohexylphenyl ketone, 2-methyl-1-[4-(methylthio)phenyl]-2-morpholinopropanone-1,2-benzyl-2-dimethylamino-1-(4-morpholinophenyl)-butanone-1, benzoin, benzoin methyl ether, benzoin ethyl ether, benzoin isopropyl ether, benzoin n-butyl ether, benzoin isobutyl ether and 1-[4-(2-hydroxyethoxy)-phenyl]-2-hydroxy-2-methyl-1-propan-1-one.

Examples of the benzyl-based compounds mentioned above include benzyl compounds and anisyl compounds.

Examples of the benzophenone-based compounds mentioned above include benzophenone, methyl o-benzoylbenzoate, Michler's Ketone, 4,4'-bis(diethylamino)benzophenone, 4,4'-dichlorobenzophenone and 4-benzoyl-4'-methyldiphenyl sulfide.

Examples of the thioxanthone-based compounds mentioned above include thioxanthone, 2-methylthioxanthone, 2-ethylthioxanthone, 2-chlorothioxanthone, 2-isopropylthioxanthone and 2,4-diethylthioxanthone.

Examples of the oxime-based compounds mentioned above include 1,2-octanedione,1-[4-(phenylthio)-,2-(O-benzoyloxime)], ethanone,1-[9-ethyl-6-(2-methylbenzoyl)-9H-carbazol-3-yl]-,1-(O-acetyloxime), methanone, (2-methylphenyl) [6-nitro-9-[3-(trimethylsilyl)propyl]-9H-carbazol-3-yl]-,1-O-acetyloxime), methanone, (9-ethyl-6-nitro-9H-carbazol-3-yl) (2-methylphenyl),O-acetyloxime, methanone, (9-ethyl-6-nitro-9H-carbazol-3-yl) [2-methyl-4-(4-morpholinyl)phenyl],O-acetyloxime, methanone, (3,5-dinitrophenyl) (9-ethyl-6-nitro-9H-carbazol-3-yl) (2-methylphenyl),O-acetyloxime, methanone, (9-ethyl-6-nitro-9H-carbazol-3-yl) (3-nitrophenyl),O-acetyloxime, 1,3,5-triazine-2,4,6(1H,3H,5H)-trione,1,3,5-tris[2-(acetyloxy)-3-[3-[(1E)-1-[(acetyloxy)iminoethyl]-6-nitro-9H-carbazol-9-yl]propyl]-, 1,2-butanedione,1-[4-(phenylthio)phenyl]-,2-(O-acetyloxime), 1,2-butanedione,1-[4-[[4-(2-hydroxyethoxy)phenyl]thio]phenyl]-2-(O-acetyloxime), 1,2-butanedione,1,1'-(thiodi-4,1-phenylene)bis-,2,2-bis(O-acetyloxime), and 1,2-octanedione,1-[4-(phenylthio)phenyl]-,2-[O-(4-methylbenzoyl)oxime].

Examples of other photopolymerization initiators include 2,4,6-trimethylbenzoyldiphenylphosphine oxide and bis(cyclopentadienyl)-bis[2,6-difluoro-3-(pyrr-1-yl)]titanium.

Among the photopolymerization initiators listed above, it is preferable to use an acetophenone-based compound in this invention from the perspective of yellowing of a coating film being low.

In this invention, a commercially available product can be used as the photopolymerization initiator of component (C), and examples thereof include N-1414, N-1717, N-1919, PZ-408, NCI-831 and NCI-930 (available from ADEKA), DAROCUR® 1173, IRGACURE® 184, IRGACURE 369, IRGACURE 907, IRGACURE 819, IRGACURE OXE 01 and IRGACURE OXE 02 (available from BASF), and ESACURE® KIP 150, ESACURE KT046, ESACURE TZT and ESACURE KB1 (available from Lamberti).

The usage quantity of the photopolymerization initiator of component (C) in this invention is preferably 0.1 to 50 parts by mass relative to a total of 100 parts by mass of the radical-polymerizable monomers of component (A) (in cases where a radical-polymerizable monomer other than component (A) is used, the total mass of the radical-polymerizable monomer of component (A) and the radical-polymerizable monomer other than component (A)) and the surfactant of component (B), and is more preferably 1 to 20 parts by mass, and particularly preferably 3 to 10 parts by mass.

A solvent may be used in the anti-fogging coating composition of this invention if necessary. Examples of the solvent include alcohol-based solvents such as methanol, ethanol, propanol, butanol, methyl cellosolve, butyl cellosolve and propylene glycol monomethyl ether; ketone-based solvents such as acetone, methyl ethyl ketone, methyl isobutyl ketone and cyclohexanone; ester-based solvents such as ethyl acetate, butyl acetate and propylene glycol monomethyl ether acetate; ether-based solvents such as tetrahydrofuran; aromatic solvents such as toluene, xylene and mesitylene; nitrogen atom-containing solvents such as dimethylformamide, dimethylacetamide and N-methylpyrrolidone, and sulfur atom-containing solvents such as dimethyl sulfoxide. It is possible to use one of these solvents in isolation, or a combination of two or more types thereof.

In cases where a solvent mentioned above is used, the usage quantity of the solvent is preferably 1 to 80 mass %, and more preferably 10 to 70 mass %, relative to the total mass of the anti-fogging coating composition of this invention from the perspectives of workability and drying properties.

A leveling agent may be used in the anti-fogging coating composition of this invention if necessary. Examples of the leveling agent include acrylic-based leveling agents, silicone-based leveling agents, fluorine-based leveling agents and vinyl-based leveling agents. It is possible to use one of these leveling agents in isolation, or a combination of two or more types thereof. In this invention, a silicone-based leveling agent is preferred from the perspectives of high surface tension-reducing performance and being able to improve the appearance of a coating film.

Examples of the silicone-based leveling agent mentioned above include BYK-300, BYK-302, BYK-306, BYK-307, BYK-310, BYK-315, BYK-320, BYK-322, BYK-323, BYK-325, BYK-330, BYK-331, BYK-333, BYK-337, BYK-344, BYK-370, BYK-375, BYK-377, BYK-UV3500, BYK-UV3510 and BYK-UV3570 (available from BYK); TEGO®-Rad2100, TEGO-Rad2200N, TEGO-Rad2250, TEGO-Rad2300, TEGO-Rad2500, TEGO-Rad2600 and TEGO-Rad2700 (available from Evonik); and Glanol 100, Glanol 115, Glanol 400, Glanol 410, Glanol 435, Glanol 440, Glanol 450, B-1484, Polyflow ATF-2, KL-600, UCR-L72 and UCR-L93 (available from Kyoeisha Chemical Co., Ltd.).

In cases where a leveling agent mentioned above is used, the usage quantity of the leveling agent is preferably 0.01 to 10 parts by mass, and more preferably 0.1 to 1 parts by mass, relative to a total of 100 parts by mass of the anti-fogging coating composition of this invention from the perspective of coating film appearance.

Additives other than the leveling agents mentioned above may be used in the anti-fogging coating composition of this invention. Such additives should be conventional publicly known additives used in coating materials, and examples thereof include pigments, plasticizers, film-forming aids, preservatives, anti-fungal agents, anti-foaming agents, thickening agents (viscosity modifiers), dispersing agents, anti-settling agents, heat resistance-improving agents, anti-skinning agents, slipping agents, desiccating agents, anti-sagging agents, matting agents, photostabilizers, antioxidants and ultraviolet radiation absorbers.

The anti-fogging coating composition of this invention is coated on a surface of a substrate, subjected to preliminary drying if necessary, and then cured by means of light irradiation to form a coating film. An article obtained by providing a coating film obtained by curing the anti-fogging coating composition of this invention on a surface of the substrate exhibits high surface hardness and transparency and particularly excellent anti-fogging properties. Therefore, the article of this invention is suitable for use as motor vehicle headlamps, mirrors and types of glasses such as goggles and sunglasses. The material of the substrate mentioned above is not particularly limited, and examples thereof include glass, polyethylene terephthalate, polycarbonates, polyimides, polyamides, polymethyl methacrylate, polystyrene, polyvinyl chloride, polyolefins, cycloolefin polymers, polytetrafluoroethylene, triacetyl cellulose, norbornene, poly(vinyl alcohol), cellulose acetate, polyarylates, polysulfones, polyethersulfones, silicon, calcite, quartz, paper, wood and metals. The substrate mentioned above may be plate-shaped, sheet-shaped or film-shaped.

Surfaces of the substrates exemplified above may be subjected to a surface treatment by means of a conventional publicly known method, such as a corona discharge treatment, flame treatment, plasma treatment, glow discharge treatment, surface roughening treatment or chemical treatment, or coated with an anchor coating agent, a primer, or the like.

The method for coating the anti-fogging coating composition of this invention on the substrate surface can be a publicly known method, and it is possible to use, for example, a curtain coating method, an extrusion coating method, a roll coating method, a spin coating method, a dip coating method, a bar coating method, a spray coating method, a slide coating method, a blade coating method, a gravure coating method or a print coating method.

EXAMPLES

This invention will now be explained in detail through the use of examples. Moreover, in the examples etc. given below, % means mass percentage unless explicitly indicated otherwise.

Components used in the working examples and comparative examples are as follows.

DPHA: Dipentaerythritol hexaacrylate

Surfactant A: A compound in which $R^1$ is a secondary undecyl group, $R^2$ is an ethylene group and n is 10 in general formula (1) above Surfactant B: A compound in which $R^1$ is a nonylphenyl group, $R^2$ is an ethylene group and n is 10 in general formula (1) above Surfactant C: A compound in which $R^1$ is a tridecafluorooctyl group, $R^2$ is an ethylene group and n is 10 in general formula (1) above Surfactant D: A compound represented by formula (2) below $$\begin{array}{l} CH_2-O-C_{11}H_{23} \\ | \\ CH-O-(C_2H_4-O)_{\overline{10}}SO_3NH_4 \\ | \\ CH_2-O-CH_2 \\ \phantom{CH_2-O-C}\diagdown CH=CH_2 \end{array} \quad (2)$$

Surfactant E: Polyoxyethylene tridecyl ether (number of ethylene oxide repeating units: 10)

Surfactant F: Polyethylene glycol monoacrylate (AE-400 available from NOF Corporation)

IRGACURE 184: Acetophenone-based photopolymerization initiator (available from BASF)

BYK-375: Silicone-based leveling agent (available from BYK)

Examples 1 to 6 and Comparative Examples 1 to 6

Coating compositions of the examples and comparative examples were obtained by adding the materials shown in Table 1 to a 50 mL screw tube and stirring for 5 minutes at 25° C. using a stirrer. Each obtained coating composition was coated on a PET film and an acrylic plate using a bar coater No. 16, subjected to preliminary drying at 80° C. for 60 seconds, and then cured using a UV curing device (product number: F300S available from Fusion UV Systems Japan K.K.) under the following conditions; wavelength: 250 to 405 nm, UV cumulative light amount: 200 mJ/cm$^2$, distance between coating composition and UV curing device: 5 cm, thereby producing a coating film on the PET film and acrylic plate. The obtained coating films were evaluated in terms of pencil hardness, haze value and contact angle using the methods described below.

[Pencil Hardness]

Using a method in accordance with JIS K 5600-5-4, the pencil hardness of a coating film prepared on a PET film and an acrylic plate was measured using a Tribo-gear tester (model number: HHS-2000 available from Shinto Scientific Co., Ltd.) under the following conditions; load: 750 g, feed scale: 20 mm, speed: 1 mm/sec. A pencil hardness of 3H or harder was evaluated as a pass for coating films prepared on PET films, and a pencil hardness of H or harder was evaluated as a pass for coating films prepared on acrylic plates.

[Haze Value]

Using a haze meter (product number: NPH 2000 available from Nippon Denshoku Industries Co., Ltd.), haze values were measured for coating films prepared on acrylic plates.

[Contact Angle]

The contact angle of water with a coating film prepared on an acrylic plate was measured by causing 1 water droplet to adhere to the coating film, leaving the coating film to stand for 1 minute, and then measuring using a contact angle meter (product number: DMs-601 available from Kyowa Interface Science Co., Ltd.). The contact angle was also measured using the same method for a coating film that had been left for 72 hours in water at 50° C. Because it can be said that a lower contact angle means higher hydrophilicity with respect to a coating film, a contact angle of 30° or less was evaluated as good anti-fogging properties.

TABLE 1

|  | Example 1 | Example 2 | Example 3 | Example 4 | Example 5 | Example 6 | Comparative Example 1 |
|---|---|---|---|---|---|---|---|
| DPHA | 4.5 | 4.0 | 3.5 | 2.5 | 4.5 | 4.5 | 4.5 |
| Methyl methacrylate |  |  | 1.0 |  |  |  |  |
| Styrene |  |  |  | 2.0 |  |  |  |
| Surfactant A | 0.5 | 1.0 | 0.5 | 0.5 |  |  |  |
| Surfactant B |  |  |  |  | 0.5 |  |  |
| Surfactant C |  |  |  |  |  | 0.5 |  |
| Surfactant D |  |  |  |  |  |  | 0.5 |
| Surfactant E |  |  |  |  |  |  |  |
| Surfactant F |  |  |  |  |  |  |  |
| IRGACURE 184 | 0.25 | 0.25 | 0.25 | 0.25 | 0.25 | 0.25 | 0.25 |
| BYK-375 | 0.03 | 0.03 | 0.03 | 0.03 | 0.03 | 0.03 | 0.03 |
| Butyl acetate | 4.72 | 4.72 | 4.72 | 4.72 | 4.72 | 4.72 | 4.72 |
| Total | 10.0 | 10.0 | 10.0 | 10.0 | 10.0 | 10.0 | 10.0 |
| Pencil hardness (acrylic plate) | 3H | 3H | 3H | 3H | 3H | 3H | 3H |
| Pencil hardness (PET film) | H | H | H | H | H | H | H |
| Haze value | 0.17 | 0.22 | 0.20 | 0.45 | 0.18 | 0.17 | 0.12 |
| Contact angle (degree) | 21.1 | 15.6 | 23.3 | 24.3 | 23.3 | 22.0 | 71.0 |
| Contact angle (degree) after immersion in water | 24.8 | 23.5 | 24.8 | 28.8 | 25.2 | 25.0 | 66.5 |

|  | Comparative Example 2 | Comparative Example 3 | Comparative Example 4 | Comparative Example 5 | Comparative Example 6 |
|---|---|---|---|---|---|
| DPHA | 4.5 | 4.5 |  |  | 5.0 |
| Methyl methacrylate |  |  | 4.5 |  |  |
| Styrene |  |  |  | 4.5 |  |
| Surfactant A |  |  | 0.5 | 0.5 |  |
| Surfactant B |  |  |  |  |  |
| Surfactant C |  |  |  |  |  |
| Surfactant D |  |  |  |  |  |
| Surfactant E | 0.5 |  |  |  |  |
| Surfactant F |  | 0.5 |  |  |  |
| IRGACURE 184 | 0.25 | 0.25 | 0.25 | 0.25 | 0.25 |
| BYK-375 | 0.03 | 0.03 | 0.03 | 0.03 | 0.03 |
| Butyl acetate | 4.72 | 4.72 | 4.72 | 4.72 | 4.72 |
| Total | 10.0 | 10.0 | 10.0 | 10.0 | 10.0 |
| Pencil hardness (acrylic plate) | 3H | 4H | F | H | 4H |
| Pencil hardness (PET film) | H | 2H | HB | F | 2H |
| Haze value | 0.55 | 0.16 | 0.18 | 0.66 | 0.15 |
| Contact angle (degree) | 18.1 | 79.2 | 19.9 | 24.6 | 82.4 |
| Contact angle (degree) after immersion in water | 78.4 | 80 | 20.3 | 30.7 | 81.2 |

Table 1 shows that Examples 1 to 6 achieved good results in terms of pencil hardness, haze value and contact angle. Comparative Examples 1 to 3 and 6 achieved relatively good results in terms of pencil hardness and haze value, but exhibited large contact angles and could not achieve results that were satisfactory in terms of anti-fogging properties. It was understood that Comparative Examples 4 and 5 achieved poor pencil hardness and had problems in terms of coating film performance.

Moreover, this international application claims priority on the basis of Japanese Patent Application No. 2016-202406, which was filed on Oct. 14, 2016, and the entire contents of that application are incorporated by reference in this specification.

INDUSTRIAL APPLICABILITY

The anti-fogging coating composition of this invention is capable of forming a coating film having high hardness and transparency and exhibiting a high anti-fogging effect, and is therefore extremely useful for imparting anti-fogging properties to motor vehicle headlamps, mirrors and types of glasses such as goggles and sunglasses, and this invention is therefore extremely useful in industrial terms.

The invention claimed is:

1. An anti-fogging coating composition comprising (A) dipentaerythritol hexaacrylate, (B) a surfactant represented by the following formula (1) and (C) a photopolymerization initiator,

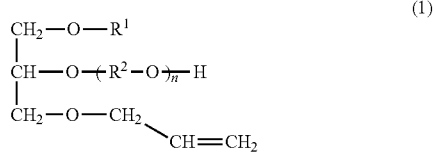

in formula (1), $R^1$ represents an unsubstituted alkyl group having 8 to 30 carbon atoms, a fluorine atom-containing alkyl group having 8 to 30 carbon atoms or an aryl group having at least one unsubstituted alkyl group having 8 to 30 carbon atoms, $R^2$ represents a divalent hydrocarbon group having 2 to 4 carbon atoms, and n represents an integer of 1 to 1000.

2. The anti-fogging coating composition according to claim 1, further comprising a radical-polymerizable monomer having one or two radical-polymerizable carbon-carbon double bonds.

3. The anti-fogging coating composition according to claim 1, wherein an amount of component (B) is 8 to 25 mass % relative to a total mass of component (A) and component (B).

4. The anti-fogging coating composition according to claim 1, wherein $R^1$ in formula (1) is an unsubstituted alkyl group having 10 to 14 carbon atoms or an aryl group having at least one unsubstituted alkyl group having 8 to 12 carbon atoms.

5. An article having a substrate and a coating film which is provided on a surface of the substrate and which is obtained by curing the anti-fogging coating composition according to claim 1.

6. The anti-fogging coating composition according to claim 2, wherein $R^1$ in formula (1) is an unsubstituted alkyl group having 10 to 14 carbon atoms or an aryl group having at least one unsubstituted alkyl group having 8 to 12 carbon atoms.

7. An article having a substrate and a coating film which is provided on a surface of the substrate and which is obtained by curing the anti-fogging coating composition according to claim 2.

8. The anti-fogging coating composition according to claim 3, wherein $R^1$ in formula (1) is an unsubstituted alkyl group having 10 to 14 carbon atoms or an aryl group having at least one unsubstituted alkyl group having 8 to 12 carbon atoms.

9. An article having a substrate and a coating film which is provided on a surface of the substrate and which is obtained by curing the anti-fogging coating composition according to claim 3.

10. An article having a substrate and a coating film which is provided on a surface of the substrate and which is obtained by curing the anti-fogging coating composition according to claim 4.

* * * * *